Aug. 22, 1967 H. W. BARTLEY 3,336,712

END WELDABLE STUD

Filed Sept. 30, 1964

INVENTOR.
H. W. BARTLEY
BY
Owen & Owen
ATTORNEYS

United States Patent Office 3,336,712
Patented Aug. 22, 1967

3,336,712
END WELDABLE STUD
Harold W. Bartley, Amherst, Ohio, assignor to Gregory Industries, Inc., Lorain, Ohio, a corporation of Michigan
Filed Sept. 30, 1964, Ser. No. 400,462
1 Claim. (Cl. 52—378)

This invention relates to an end weldable stud and more particularly to an end weldable stud of relatively complex shape which can be made from a single piece of metal stock without requiring additional welding or machining operations.

Most end weldable studs heretofore known have been made of heavy bar stock and formed in screw machines or in cold headers. Such studs usually have been of simple shape, including straight shanks with cylindrical heads of a diameter larger than the shanks. As the number of applications for end weldable studs have increased, studs of relatively complicated shape have been developed, many of which cannot be made by the conventional mass production techniques heretofore employed. The more complex studs often must be made of two or more pieces which must then be joined together.

The present invention relates to an end weldable stud of a shape not suitable for manufacturing by the usual heading or similar operations. The new stud can be made of a single piece of metal stock so that special cutting and joining steps are eliminated. The stud also can be made of commercially-available metal stock with a minimum number of machining operations being required. The standard metal stock of which the weldable stud is made is first cut to a predetermined length and then doubled back on itself at an intermediate portion to form a pair of contiguous, parallel legs with a short, connecting end web. The free ends of the legs then can be bent or otherwise shaped to adapt the stud for the intended function. A recess is centrally formed in the web and a mass of suitable fluxing material rammed tightly into the recess and shaped at the same time to a conical or other desired configuration to complete the stud.

The present invention is specifically illustrated in the form of a stud or hanger for furnace refractories. In the construction of high temperature furnaces, it has been found to be advantageous to provide the insulating refractory liner by a spraying or blowing process rather than by laying refractory bricks. The refractory is applied over a multiplicity of projections or hangers extending inwardly from the metal supporting wall forming the structural support for the furnace, with the projections providing the proper support for the refractory. Because of the number of supporting projections required, their application to the supporting wall has heretofore been a difficult and time consuming job.

The new stud for supporting a refractory, insulating layer or liner is applied to the metal structural wall by an end welding technique prior to the insulation being blown thereover. The stud is of relatively complicated, Y-shaped configuration and is produced by a technique in which the stock such as a rod, is doubled back on itself so that the entire stud is made of a single length of rod. As previously discussed, this greatly reduces the number of manufacturing operations required and also eliminates welding or other joining operations which would otherwise be necessary to affix two or more pieces together constituting the stud or hanger.

It is, therefore, a principal object of the invention to provide an end weldable stud which requires fewer manufacturing operations than those heretofore known.

Another object of the invention is to provide for the manufacture of a refractory hanger stud with fewer operations and less equipment.

Other objects and advantages of the invention will be apparent from the following detailed description of a preferred embodiment thereof, reference being made to the accompanying drawing, in which.

Figure 1:
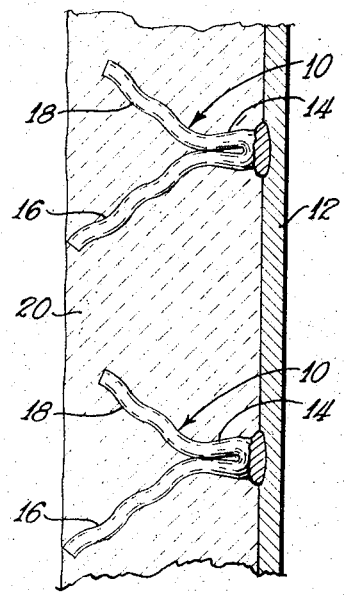
FIG. 1 is a fragmentary view in vertical cross section of a furnace wall including a layer of refractory and refractory studs according to the invention.

Referring to the drawing, a hanger or stud 10 is shown welded to a metal supporting wall 12 constituting the outer layer of a furnace wall. The stud 10 has a main shank 14 end welded to the wall perpendicularly thereto, with two arms 16 and 8 diverging from the shank. The arm 16 is longer than the arm 18 and constitutes a gauge for the depth of the layer of refractory insulation applied to the wall 12. When the wall has been covered with the studs 10 at suitably-spaced intervals, a layer 20 of insulation is blown or sprayed on the wall 12 to a depth equal to the protrusion or extension of the end of the arm 16 from the wall 12. After the insulation is applied, it is troweled to smooth the surface and complete the wall construction.

By making the two arms 16 and 18 of different lengths, the longer one provides the gauge as mentioned above and, should it burn off due to furnace heat, the shorter one still provides an effective support for the insulation. Further, the short arm is under the surface of the insulation and is thereby protected against the heat and possible destruction.

Figure 2:
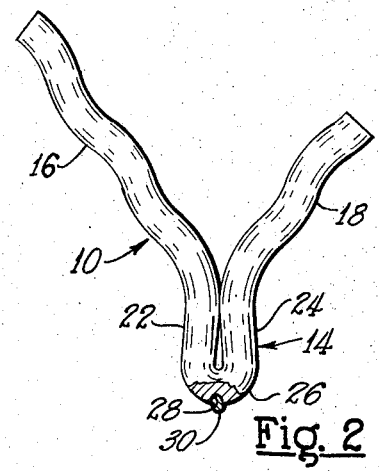
FIG. 2 is an enlarged view in elevation with parts broken away and with parts in section, of the refractory stud shown in FIG. 1.
Figure 3:
FIG. 3 is an end view of the stud.

Referring more particularly to FIG. 2, the stud 10 is made of a single rod of metal in the order of one-quarter inch in diameter. The rod is first cut to a predetermined length, after which it is doubled back to form two generally parallel, contiguous legs 22 and 24 connected by a short web 26, the three constituting the shank 14. The outer portions of the rod are then bent in diverging directions to form the arms 16 and 18. The arms then can be bent to the undulating shape for greater holding power, if desired. The stud thus can be formed quickly with a minimum number of operations and without the necessity of welding the insulation-retaining arms to the shank, as would otherwise be necessary.

Either before or after the rod is doubled back to form the shank, an end recess 28 is formed in the connecting web portion 26, as shown in FIG. 2. The recess can be punched or drilled and is then filled with a mass of flux which is shaped in a generally conical configuration to provide a flux body 30. The mass of flux can be rammed into the recess 28 and shaped by a suitable punch in one operation.

The now completed stud can be end welded to the metal wall 12 by a suitable end welding technique, such as is disclosed in Nelson Patent No. 2,191,494. The flux body 30 includes a suitable oxygen-scavenging material such as aluminum to aid in the welding operation and in drawing an arc as the stud is retracted. The end welding technique itself takes only a matter of a second or two and the overall loading and welding operations for a stud can be done very quickly. Hence, an entire wall of the furnace can be provided with the studs 10 in a much shorter period of time than heretofore possible. Further, the studs can be made very inexpensively due to the fact that they are a single length of standard rod stock and require no welding or other joining of separate elements. Thus, the manufacturing operation is simple and the material of which the stud is made is relatively inexpensive.

Various modifications of the above described embodiment of the invention will be apparent to those skilled in the art, and it is to be understood that such modifications can be made without departing from the scope of the invention, if they are within the spirit and tenor of the accompanying claim.

I claim:

In combination, a metal wall, a plurality of refractory hangers affixed to said wall, each of said hangers comprising a single piece of metal of substantially uniform thickness throughout its length, an intermediate portion of said piece forming a pair of generally parallel, contiguous legs, an intermediate web integrally joining ends of said legs, said web being welded to said metal wall, portions of the opposite ends of said legs spaced from said web extending in diverging relationship to form a Y-shaped configuration for said hanger, one of said diverging portions being substantially longer than the other, and a refractory layer on said metal wall, the longer diverging portions of said hangers extending substantially to the outer surface of said refractory layer with the shorter diverging portions being completely embedded in the layer.

References Cited

UNITED STATES PATENTS

| | | | |
|---|---|---|---|
| 2,883,215 | 4/1959 | Jenkins | 219—99 |
| 3,077,058 | 2/1963 | Hensel | 52—378 |

FRANCIS K. ZUGEL, *Primary Examiner.*